Figure 1:
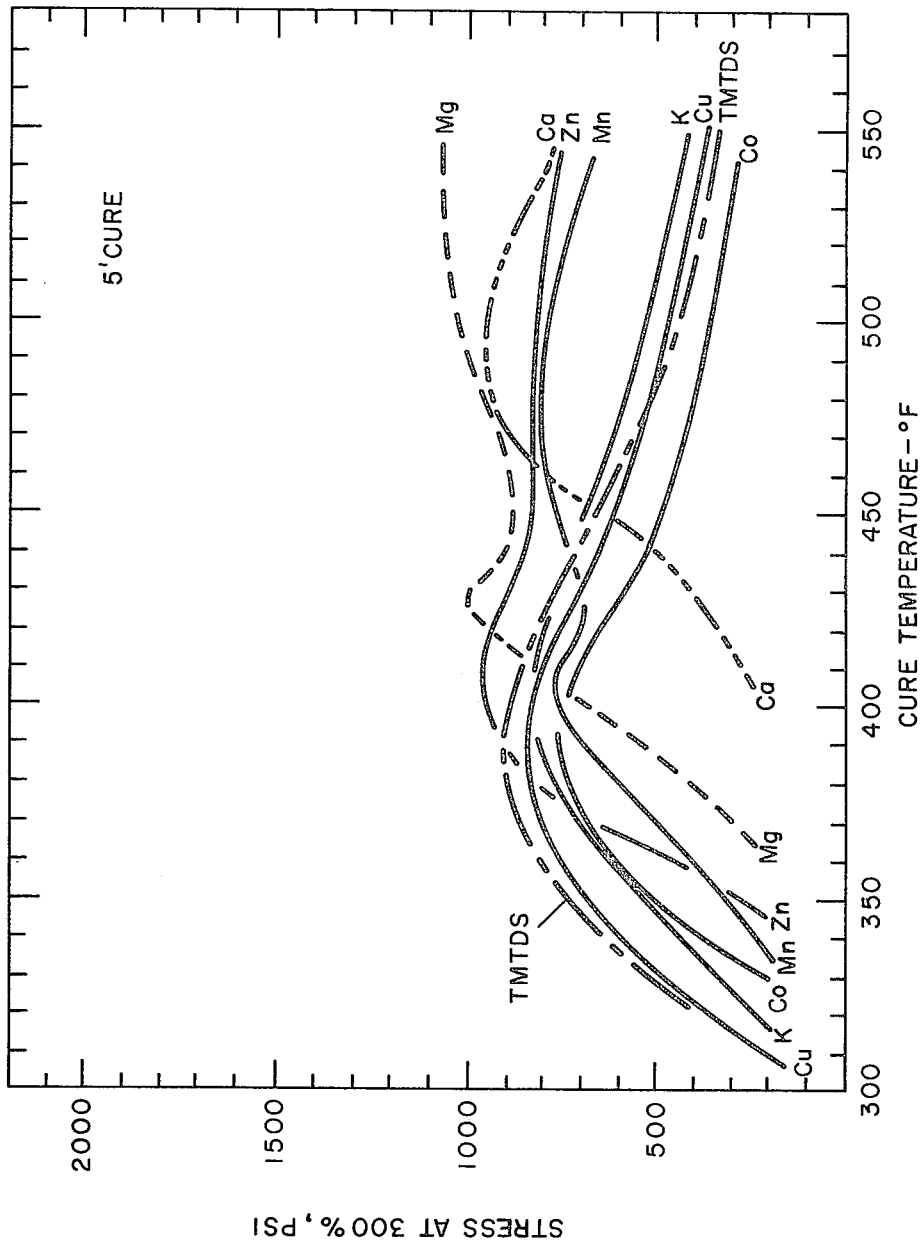

United States Patent [19]
Fischer

[11] 3,904,591
[45] Sept. 9, 1975

[54] PRIMARY ACCELERATORS FOR SULFUR-CURED ELASTOMERS

[75] Inventor: Wilbur F. Fischer, Cranford, N.J.

[73] Assignee: Exxon Research and Engineering Company, Linden, N.J.

[22] Filed: May 20, 1971

[21] Appl. No.: 145,291

[52] U.S. Cl............ 260/79.5 B; 252/182; 252/431; 260/23.7 M; 260/79.5 A; 260/779; 260/783; 260/795; 260/798; 260/888
[51] Int. Cl..... C08c 11/64; C08c 11/04; C08d 9/00
[58] Field of Search .......... 260/79.5, 779, 783, 795, 260/798

[56] References Cited
UNITED STATES PATENTS

| | | | |
|---|---|---|---|
| 2,311,656 | 2/1943 | Griffith | 260/768 |
| 2,582,795 | 1/1952 | Prentiss | 260/41.5 |
| 3,322,802 | 5/1967 | Brooks | 260/429 |
| 3,494,900 | 2/1970 | Morita | 260/79.5 |
| 3,641,211 | 2/1972 | Strange | 260/889 |

FOREIGN PATENTS OR APPLICATIONS

| | | | |
|---|---|---|---|
| 1,186,693 | 4/1970 | United Kingdom | 260/775 |
| 453,477 | 12/1948 | Canada | 260/783 |
| 1,302,964 | 7/1962 | France | 260/79.5 |

OTHER PUBLICATIONS

Rubber Chem. and Technology, 35, pg 1100 (October–November 1962)

*Primary Examiner*—Christopher A. Henderson, Jr.
*Attorney, Agent, or Firm*—E. J. Fanning; W. T. Clarke

[57] ABSTRACT

Simple metal salts are found to be useful as primary accelerators for the sulfur vulcanization of nonpolar, unsaturated hydrocarbon rubbers. Useful metals include those of Group I-A, Group II-A, and transition metals of the periodic table including mixtures thereof. The metals are usually employed in the form of metallo-organic compounds. However, certain inorganic metal salts such as metal halides, carbonates and nitrates are also applicable.

1 Claim, 3 Drawing Figures

METAL NEODECANOATE CURATIVES—CURE INITIATION, MODULUS LEVEL, STABILITY

METAL NEODECANOATE CURATIVES — TENSILE STABILITY vs. CURE TEMPERATURE

PRIMARY ACCELERATORS FOR SULFUR-CURED ELASTOMERS

BACKGROUND OF THE INVENTION

It is known that certain metal salts, such as alkali metal organic acid salts, are useful as accelerators in the sulfur cure of some polar polymers such as halogenated elastomers (see, e.g., U.S. Pat. No. 3,458,461). It is also known that metal salts such as zinc stearate, zinc oxide, etc., are useful as stabilizers or secondary accelerators in combination with primary accelerators such as thiuram derivatives and dithiocarbamates in the sulfur cure of low unsaturated rubbers.

THE PRESENT INVENTION

It has now been unexpectedly discovered that a certain class of simple metal salts may be used as primary accelerators in the sulfur cure of nonpolar, unsaturated hydrocarbon rubbers. This new cure system results in significant economic savings over conventional organo-sulfur cure systems presently in use. For example, compound costs for the instant cure system may be reduced to roughly half that of conventional systems. Further, more economical mixing cycles, i.e., one-step mixes, may be attained. More importantly, greatly increased cure control (i.e., control of cure over a broad temperature spectrum), use of higher processing temperatures and development of high physical properties (e.g., modulus, rupture tensile, elongation, etc.) at high cure temperatures are possible with the instant vulcanization system.

It should be understood that for purposes of this invention what is meant by nonpolar rubbers are those rubbers having induced dipoles as opposed to rubbers having permanent dipoles such as nitrile rubbers or halogenated rubbers which are classified herein as polar rubbers.

The rubbers for which the novel cure systems of the instant invention are applicable include ethylene-propylene-diene -diene terpolymers (EPDMs). The term "EPDM" is used in the sense of its definition as found in ASTM D1418-64. These polymers normally contain about 45 to about 90 wt. % ethylene and about 2 to about 10 wt. % of a diene monomer, the balance of the polymer being propylene. Preferably, the polymer contains about 50 to about 75 wt. % ethylene, e.g., 56 wt. %, and about 2.6 to about 4 wt. % of a diene monomer, e.g., 3.3 wt. %. The viscosity average molecular weight range is generally 40,000 to 800,000, preferably 80,000 to 450,000, and most preferably 150,000 to 300,000. The diene monomer is preferably a non-conjugated diene. Typical examples of non-conjugated dienes include 5-alkylidene-2-norbornenes such as 5-methylene-2-norbornene, 5-ethylidene-2-norbornene, etc.; 5-alkenyl-2-norbornenes such as 5-vinyl-2-norbornene, 5-(3'-butene)-2-norbornene, etc.; 2-alkyl-norbornadienes such as 2-methyl-norbornadiene, 2-ethyl-norbornadiene, etc.; acyclic nonconjugated dienes such as 2,4-dimethyl-2,7-octadiene, 11-ethyl-1,11-tridecadiene, 1,4-hexadiene, etc.; alicyclic non-conjugated dienes such as dicyclopentadiene, 3-methallyl cyclopentene, 1,5-cyclooctadiene, etc.; hydroindenes such as 4,7,8,9-tetrahydroindene, etc.

Other applicable rubbers include butyl rubber, styrene butadiene copolymers (SBRs), polyisoprene, polybutadiene, etc. The term "butyl rubber" is intended to include copolymers made from a polymerization reaction mixture having therein from 70 to 99.5% by weight of an isoolefin which has about 4 to 7 carbon atoms, e.g., isobutylene, and about 0.5 to 30% by weight of a conjugated multiolefin having from 4 to 14 carbon atoms, e.g., isoprene, piperylene, etc. The resulting copolymer contains 85 to 99.8% by weight of combined isoolefin and 0.2 to 15% of combined multiolefin. Butyl rubber generally has a Staudinger molecular weight of about 20,000 to about 500,000, preferably about 25,000 to about 400,000, especially about 100,000 to about 400,000, and a Wijs iodine number of about 0.5 to 50, preferably 1 to 15.

SBR is well-known to the art. Typically, these polymers contain about 5 to about 40 wt. % styrene and have a Wijs iodine number of about 300 to about 500 and a number average molecular weight of about 3,000 to about 600,000, preferably about 100,000 to about 150,000.

Polyisoprene (e.g., natural rubber, gutta-percha, balata and synthetics) and polybutadiene (either cis-1,4,trans-1,4 or mixtures) are polymers well-known in the art. They have number average molecular weights in the range of about 3,000 to about 600,000, and preferably 100,000 to about 350,000.

Of course, the metal curatives of the instant invention would also be applicable to blends of nonpolar unsaturated hydrocarbon rubbers, for example, an EPDM-SBR-isoprene blend.

The metal salts which are useful as primary accelerators in the instant invention include salts of the Group I-A, Group II-A, and transition metals of the periodic table of the elements and mixtures thereof. Preferably, the metal to be employed will be one of the following: Cu, K, Mn, Co, Fe, Ce, Zr, Ba, Pb, Zn, Li, Mg, and mixtures thereof.

These metal salts are normally employed in the form of metallo-organic compounds. Although some writers define metallo-organic compounds as including organometallic compounds (i.e., compounds having a direct metal-carbon bond), the more usual definition, and the one used in this invention, includes only compounds in which the metal cation is bonded to the organic moiety (i.e., the anion) through other than a carbon atom, e.g., through an N, P, O, S, etc. This definition is, of course, not meant to exclude compounds which may possess organometallic bonding in addition to the required metallo-organic bonding.

Thus, by metallo-organic compounds is meant to include mono, di, and poly-carboxylic acid salts of the abovementioned metals. Preferably, carboxylic acid salts having a carbon number range of from $C_2$ to about $C_{30}$ (more preferably $C_3$ to about $C_{13}$) will be employed. Illustrative examples of useful carboxylate anions include acetates, stearates, octanoates, neodecanoates, naphthenates, phenolates, phthalates, ricinoleates, acrylates, etc.

Also meant to be included are metal salts of thioacids (e.g., thiolic acids, thionic acids, thiophenol, etc.) and metal alkoxides (e.g., magnesium alcoholates, etc.). Preferable carbon number ranges for the thioacids and alkoxides will be the same as for the carboxylic acids. Nonreactive substituents may, of course, also be present in the hydrocarbon portion of any of the above metallo-organic compounds and are meant to be included in the definition thereof.

Other metal salts which act as effective accelerators within the scope of the instant invention are certain inorganic salts of the above-mentioned metals, such as metal halides (i.e., fluorides, chlorides, bromides, iodides), metal carbonates, metal nitrates, metal sulfates, etc.

It has also been found that effective accelerators may result from complexing the above-mentioned metalloorganic compounds and inorganic salts with compounds having the following general formula:

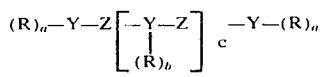

wherein R is hydrogen or the same or different $C_1$–$C_4$ alkyl radical, $a$ is 1 or 2 depending on the valence of Y, $b$ is 0 or 1 depending on the valence of Y, $c$ is an integer from 0 to 3, Y is nitrogen, oxygen, phosphorus or sulfur, and Z is a nonreactive radical selected from the group consisting of (1) $C_4$–$C_{10}$ cycloaliphatic or aromatic radicals and their lower alkyl derivatives wherein said radicals are attached to the Y atoms at 1,2- positions on the aromatic rings or 1,2- or 1,3-positions on the cycloaliphatic rings; and (2) 1 to 4 methylenic radicals wherein each methylenic radical contains 0 to 2 monovalent hydrocarbon radicals of 1 to 6 carbon atoms.

Suitable nonlimiting examples of compounds falling within the scope of the above formula include: ethanediamine (EDA), N,N,N', N'-tetramethyl ethanediamine (TMED), N,N,N', N'', N''-pentamethyl diethylene-triamine (PMDT), beta-(dimethylamino) ethyl methyl ether, ortho-dimethylamino anisole, beta-(dimethylamino)ethyl methyl sulfide, 1-dimethylamino-2-dimethylphosphine, cis-N,N,N', N'-tetramethyl-1,2-cyclopentane diamine, diethylene glycol dimethyl ether (diglyme), etc.

The major considerations in selecting the anion portion of the salt are ease of dispersion of the salt at processing temperatures of 100°–250°F. and effectiveness in curing the rubber at higher temperatures of 300°–475°F. Some factors involved are solubility of the salt in the rubber compound, particle size, and ability to complex with the sulfur at vulcanization temperatures to form the accelerating species. Any similar salt possessing these properties should be useful as an accelerator in the instant invention.

It has been found that there is a relationship between the capacity of a metal salt to accelerate rubber vulcanization and the lattice energy of that salt. Thus, for example, metal oxides which have a lattice energy in the range of from 724 to 4,615 kcal/mole have been found to be ineffective as accelerators for the rubbers of the instant invention. Opposingly, salts such as $LiNO_3$, $ZnCl_2$, ZnOAc and $Cu(OAc)_2$ having lattice energies of 193, 645, 657 and 679 kcal/mole, respectively, are effective accelerators. As a good general rule to employ in selecting useful accelerators, one should select a salt of one of the aforementioned metals which has a lattice energy of less than about 700 kcal/mole. Below this upper limit there is a rather general, but not invariable, relationship between lattice energy and activity order of the metal curatives.

Table I below lists lattice energies in kcal/mole of various metal salts:

TABLE I*

| Acetates | Chlorides | Accelerators Nitrates | Thiocyanates | Non-Accelerators Oxides |
|---|---|---|---|---|
| Ba-485 | Zn-645 | Li-193-199 | Ba-473 | Co-955-976 |
| Pb-532 | Mn-568 | Cs-144-151 | Pb-492 | Ca-816-886 |
| Cu-679 | Co-621 | Ba-480 | | Mg-907-942 |
| Zn-657 | Cu-649 | Pb-516 | | Ba-724-766 |
| | | Cu-647 | | Zn-979 |
| | | | | Ti-2429-2900 |

*Lattice energies obtained from Progress in Solid State Chemistry, Vol. 1, Chapter 2, The MacMillan Co., N.Y. (1964).

Representative examples of preferred anions to be used in combination with cations of the metals listed above to form the metal accelerators of the instant invention include but are not limited to the acetate, octoate, neodecanoate, naphthenate, carbonate, chloride, etc.

While the above discussion indicates applicable anions, it must be noted that the most important consideration in determining the metal accelerator to be employed in a particular process is the type and amount of metal ion. The anion portion of the salt is important only insofar as it allows the metal to be efficiently incorporated in the rubber and does not unduly restrict its activity so as to allow it to function as a primary accelerator. For example, at a constant lead content three different lead organo compounds of Table II, being easily dispersible in the rubber (an EPDM having 52 wt. % ethylene, 45 wt. % propylene and 3 wt. % diene monomer) cured to give similar results within each group of measurements. Results indicate the anion portion of the curative is important only to conferring solubility in the rubber and thereafter has little effect on vulcanization events.

TABLE II

EFFECT OF ORGANO PORTION OF LEAD CURATIVE
Constant Lead Content 1 phr

| Lead Compound | Cure Initiation 10″ at °F. | Maximum Stress Levels | | | Modulus at 500°F. |
| | | Tensile | 200% Modulus | Elong. | |
|---|---|---|---|---|---|
| Octoate | 305 | 1630 | 550 | 480 | 490 |
| Neodecanoate | 308 | 1550 | 570 | 480 | 510 |
| Naphthenate | 301 | 1590 | 550 | 500 | 460 |
| Max. Deviation from Average | 4% | 3% | 2% | 3% | 5% |

NOTE: Initial tensile and modulus maxima coincided in all cases at 10′ at 375°F.

A comparison of zinc chloride, acetate and stearate at 0.7–1.0 part zinc content in Table III, further confirms that when the metal is available in useful form the cure initiation, optimum cure and physical properties will be similar. Contrastingly, finely powdered zinc chromate or zinc oxide which have doubtful solubility in the rubber, and lattice energies above that considered to be acceptable, are poor accelerators as evidenced by optimum cure (maximum stress development) occurring 70° to 90°F. higher than the more active zinc compounds.

TABLE III

ACCELERATION BY SIMPLE ZINC COMPOUNDS

| Zinc Curative* | | | Cure Activity 5' | | Maximum Stress Levels | | |
|---|---|---|---|---|---|---|---|
| Type | Cmpd phr | Zinc phr | Initiation °F. | Optimum °F. | Tensile | 200% Modulus | Elong. |
| Chloride | 2 | 1.0 | 315 | 400 | 1630 | 780 | 450 |
| Acetate | 2 | 0.7 | 318 | 410 | 1700 | 820 | 430 |
| Stearate | 6.8 | 0.7 | 326 | 400 | 1720 | 670 | 520 |
| Chromate | 2 | 0.7 | 345 | 470 | 1610 | 700 | 500 |
| Oxide | * | — | 390 | 390 | 1500 | 550 | 530 |

* 5 — zinc oxide; 1 — stearic acid; 2 — sulfur, common to all compounds.

Although the amount of metal to be employed as an accelerator in the vulcanization of the types of rubbers hereinbefore described is dependent to some extent on the activity of the metal used, generally from about 0.25 to about 10 parts, and preferably 1 to 4 parts, of metal salt are employed per hundred parts of rubber.

Rubbers are usually compounded with a variety of other ingredients using a two-step mix with the sulfur and/or accelerators added in the second step. This, in fact, was the compounding procedure followed in preparing the materials shown in Tables II, III, V and VI herein. A representative composition (all components shown are in parts per hundred rubber - phr) would be:

| 1 — Masterbatching Mix | | 2 — Acceleration Mix | |
|---|---|---|---|
| Rubber | 100 | Masterbatch | 150–450 |
| Zinc Oxide | 5 | Sulfur | 2 |
| Stearic Acid | 1 | Accelerators | 0.25–10 |
| Carbon Black | 50–200 | | |
| Oil Plasticizer | 10–100 | | |

Filler masterbatching is usually accomplished in an internal mixer (e.g., a Banbury mixer) that shears the rubber and effectively disperses the dry ingredients and oil in 2'–15' mixes to dump temperatures of 250°–350°F. Vulcanizing agents can be added to the masterbatch either on the mill or in a second Banbury mix in about 2 to about 5 minutes to <250°F. mix temperatures. Thereafter, the rubber is formed and vulcanized into its permanent shape in about 20 to about 1 minute, at 300°–450°F. temperatures, respectively, using various methods (e.g., compression or injection molding, extrusion and continuous vulcanization, autoclave curing, etc.) It should be noted that while such a two-step mix was employed herein in order to obtain uniformity of results by using the same masterbatch, the present invention allows one-step mixes to be readily employed.

Any of the well-known oil plasticizers and carbon blacks are useful in the present invention. The more chemically active, highly oxygenated channel and furnace blacks are preferred since it has been discovered that these types of blacks may themselves effectively cocure rubbers with element sulfur without additional accelerators when high temperature curing techniques (e.g., temperatures in the range of about 400° to about 500°F.) are employed. For example, the nonaccelerated sulfur cure of EPDM produces a 200% modulus of only 350 psi for the least active thermal black (MT) at 490°F. but 900 psi and 1100 psi for the more active EPC and HAF carbon blacks, respectively. Maximum rupture tensile which develops somewhat earlier (about 460°F. measured 1200 psi/MT, 2000 psi/EPC and 1700 for the HAF carbon black. Thus, when used in combination with the metal accelerators of the instant invention even more effective cures may be attained, particularly at higher temperatures.

Examples of preferred blacks include the low and high structure furnace blacks, channel black, etc., which now readily cure at 390°F. using only sulfur and zinc acetate as the cure system.

It has also been discovered that the metal salts of the instant invention may be classified in order of metal activity according to cure initiation which covers a temperature range from about 285° to about 390°F. Table IV below indicates this activity which was calculated using an EPDM having the following physical properties: 52 wt. % ethylene, 45 wt. % propylene, 3 wt. % diene, a viscosity average molecular weight of 150,000 and a Mooney viscosity ML of 60 at 260°F. Although the activity order was calculated using an EPDM, the same order of activity, with minor variations in temperature, would be expected for any of the rubbers useful in the instant invention.

TABLE IV

ACTIVITY ORDER OF METAL TYPES — 5 MINUTE CURE INITIATION

| Metal | °F. | Metal | °F. |
|---|---|---|---|
| Copper | 286 | Lead | 330 |
| Potassium | 292 | Zinc | 332 |
| Manganese | 305 | Lithium | 345 |
| Cobalt | 312 | Magnesium | 345 |
| Iron | 315 | Calcium | 388 |
| Cerium | 319 | Thiuram (TMTDS) | 285 |
| Zirconium | 322 | Sulfur only | 375 |
| Barium | 323 | | |

This activity order was determined using the gradient temperature "zero modulus" method. For an excellent discussion of this method, see the article by W. F. Fischer appearing in *Rubber Age* (Aug. 1970), pp. 54–69.

By using the above information concerning activity order, it is possible for one skilled in the art to readily determine the most desirable accelerator or mixtures of accelerators to employ under any time-temperature condition of processing or vulcanization. For example, copper neodecanoate which activates cure in 5' at 286°F. would be used to quickly cure soft low-hardness compounds where mechanical heat buildup is not a problem. To prevent undesirable prevulcanization during processing of tough high-hardness compounds, cerium neodecanoate might be selected since vulcanization does not begin before 5' at 319°F. (equivalent to 25' at 286°F.). This orderly cataloging of metal accelerator activity is very useful since the time-temperature relation of chemical reactions follows a generally accepted rule which indicates that for each 10°F. rise in temperature the rate increases by a fixed factor or temperature coefficient of 1.5. (See, *The Vanderbilt Rubber Handbook*, p. 622, Bryant Press, Inc., New York (1968).) Optimum vulcanization time in this case is reduced by one-third, e.g., optimum cures occur at 9'/310°F. or 6'/320°F. Thus the problem of prevulcanization and location of optimum vulcanization conditions is substantially obviated.

Table V, below, is representative of the unusual ability of metal curatives of the instant invention to control the location, level and duration (stability) of vulcanization events. The anion employed is a neodecanoate in each case. However, as discussed previously, the metal type and not the anion is the most important consideration and any of the previously mentioned applicable anions would give similar results.

It can be seen from the information in Table V that one may, if desired, select a mixture of metal curatives so as to effect both early cure initiation and very broad duration of cure. Thus, for example, a combination of copper and lithium salts would result in cure initiation at about 286°F. for a 5-minute cure and attain crosslink stability over the range of from about 340°–550°F.

Figure 2:
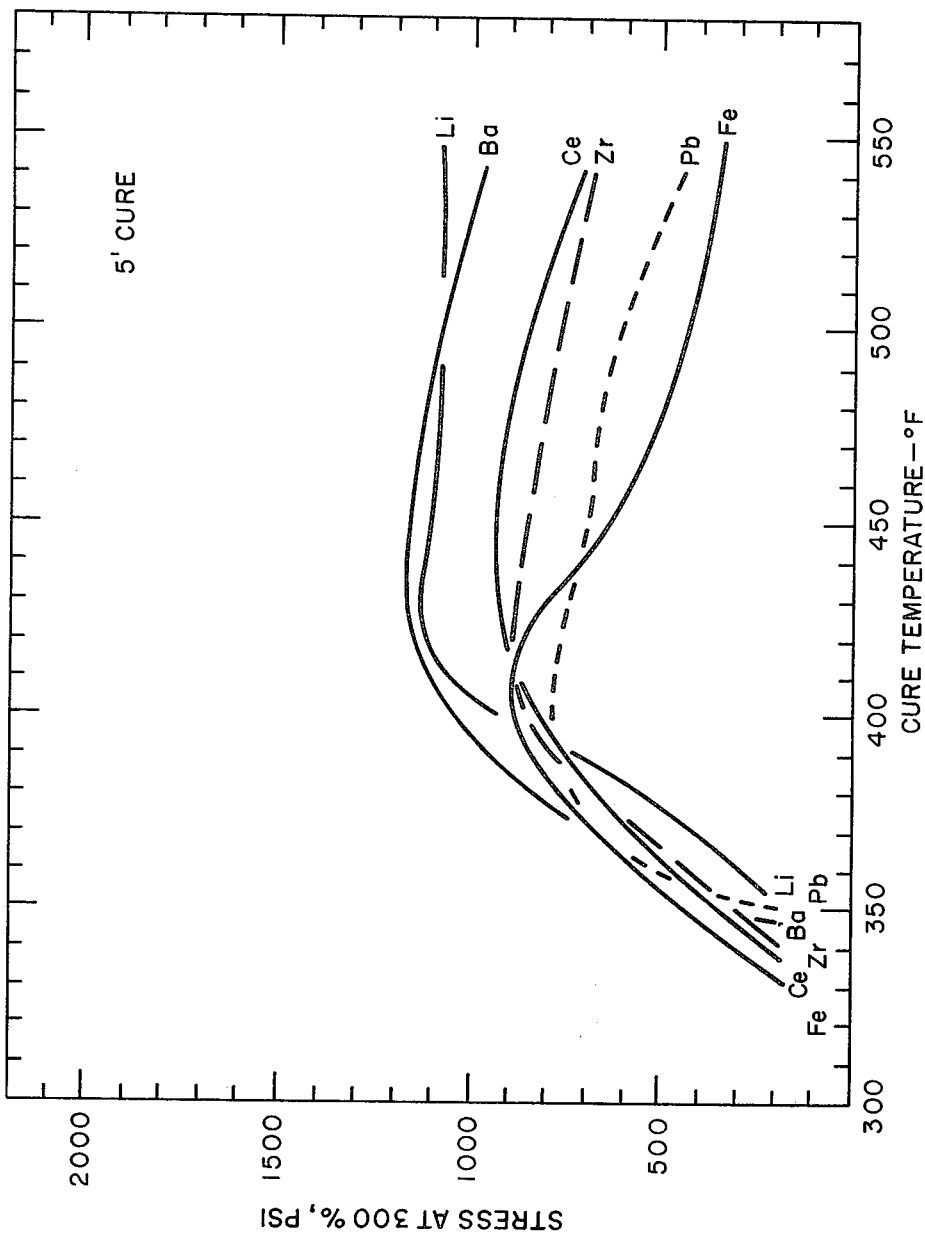

Use of the accelerators of the instant invention also enables production of high strength vulcanizates over the temperature range of from about 300° to about 550°F. The prior art conventional organo-sulfur curatives are normally used in a range of 300°–400°F., and at temperatures much over 400°F. effective control of vulcanization events is questionable with the likelihood of production of relatively unstable materials. By contrast, the instant invention enables production of vulcanizates having high physical properties over the 400°–550°F. temperature range. This may be illustrated by reference to FIGS. 1 and 2, which represent plots of 300% modulus vs. 5-minute cure at 300°–550°F. for both the metal curatives of the instant invention and the prior art tetramethyl thiuram disulfide (TMTDS) cure. The anion employed in all cases for the metal curatives of the instant invention was a neodecanoate and the rubber employed was an EPDM having the following physical properties: 52 wt. % ethylene, 45 wt. % propylene, 3 wt. % diene, a viscosity average molecular weight of 150,000 and a gum Mooney viscosity ML of 60 at 260°F. As in Table V, the compound contained 140 parts of carbon black and 60 parts of oil.

Prior art curatives such as TMTDS initiate cure over the temperature range of about 285°–340°F., presumably by the formation of predominantly long polysulfidic cross-links. However, it can be seen from the

TABLE V

USE OF METAL SALTS OF NEO ACIDS AS VULCANIZATION ACCELERATORS FOR EPDM(3)

| Metal phr(0) | 5' Cure Initiation °F. | Maximum Physicals 300% Mod.-Rating(1) | Tensile | Minimum Elongation at Mod.Max. | Crosslink Stability Range, °F.(2) | Spread | Rating(1) |
|---|---|---|---|---|---|---|---|
| Copper-2 | 286 | 820  4 | 1560 | 610 | 340–440 | 100 | 6 |
| Potassium-2 | 292 | 830  4 | 1580 | 610 | 360–470 | 110 | 6 |
| Manganese-2 | 305 | 760  5 | 1400 | 540 | 385–550+ (Double Peak) | 165 | 3 |
| Cobalt-4 | 312 | 760  5 | 1520 | 680 | 355–430 | 75 | 8 |
| Iron-2 | 315 | 900  3 | 1500 | 530 | 370–440 | 70 | 8 |
| Cerium-2 | 319 | 950  3 | 1400 | 420 | 390–530 | 140 | 4 |
| Zirconium-4 | 322 | 860  4 | 1330 | 530 | 380–550 | 180 | 1 |
| Barium-4 | 323 | 1170  1 | 1520 | 420 | 395–545 | 150 | 4 |
| Lead-4 | 330 | 780  5 | 1600 | 610 | 360–510 | 150 | 5 |
| Zinc-4 | 332 | 950  3 | 1550 | 510 | 375–540 | 165 | 2 |
| Lithium-1 | 345 | >1120  2 | 1120 | 300 | 400–550 | 150 | 4 |
| Magnesium-1 | 345 | 1100  2 | 1380 | 420 | 410->550 | >140 | 3 |
| Calcium-2 | 388 | 960  3 | 1370 | 410 | 455–550 | 95 | 7 |
| TMTDS-S (Control) | 285 | 900  3 | 1620 | 530 | 345–440 | 90 | 8 |

(0) Parts per 100 phr as metal salt $C_{10}$ neo acid.
(1) Rating 1 = (best); highest modulus or stability.
(2) Extreme temperature within which 80% of maximum 300% modulus is retained.
(3) EPDM same as employed in Table IV.

Figure 3:
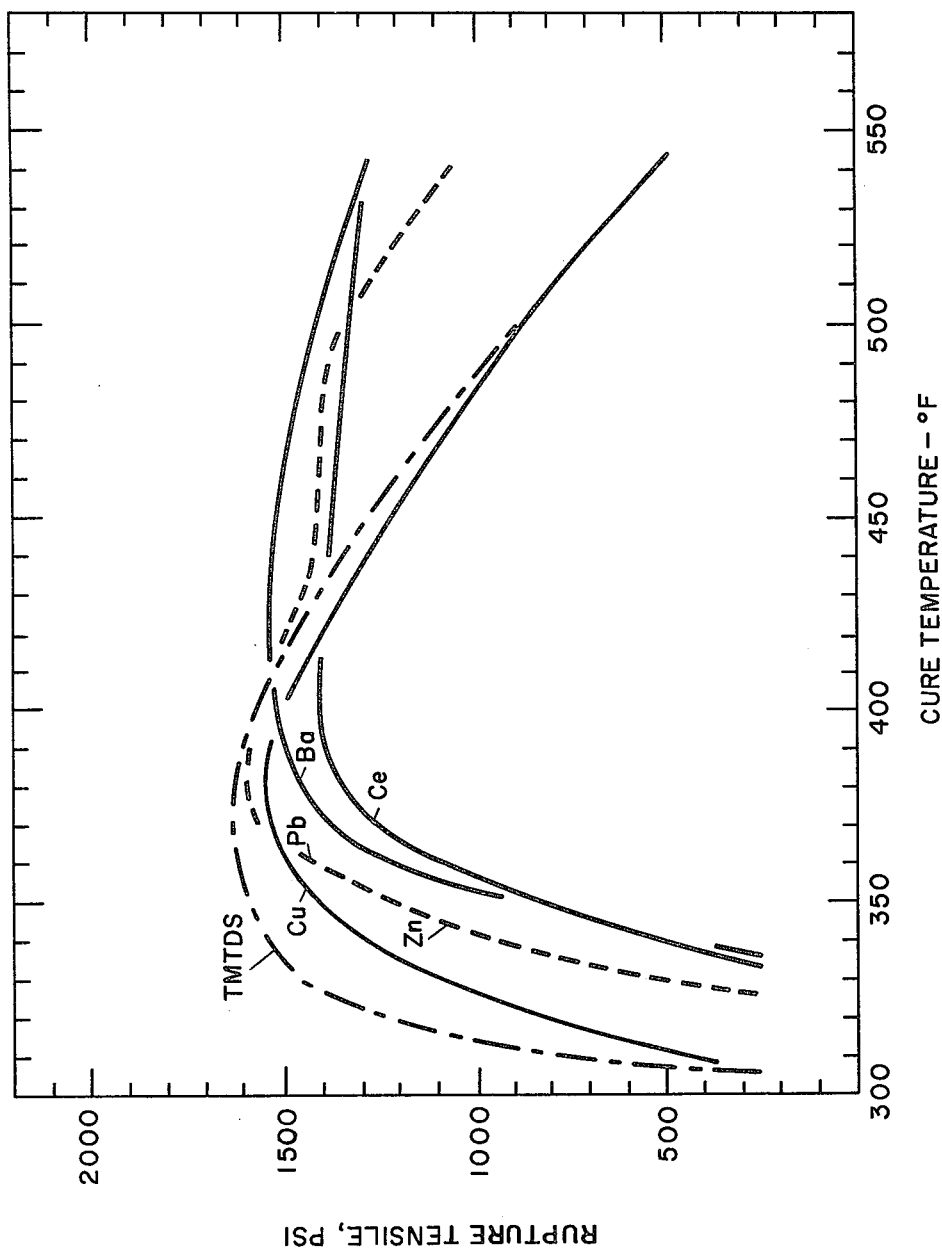

FORMULATION
| | |
|---|---|
| EPDM | 100 |
| Stearic Acid | 1 |
| Zinc Oxide | 5 |
| SRF Black | 140 |
| Flexon 791 Oil | 60 |
| Sulfur | 2 |
| Metal Salt | 1–4 (as indicated) |
| Exception: | |
| TMTDS | 2.3 |
| Sulfur | 2.5 | above-mentioned figures that beyond the modulus peak at approximately 400°F. for TMTDS, a substantial 50% decrease in modulus occurs over the temperature range of about 450°–500°F. By contrast, it can be seen from the same figures, that modulus levels for many of the metal curatives of the instant invention (e.g., Ba, Ce) are quite high and yield a desirably flat response over the same temperature region. This has a very desirable influence on rupture tensile as exemplified in FIG. 3. Thus, the metal curatives provide improved control of cure state which strongly influences the quality of rubber parts.

These figures and the information in Table V above also reflect significant differences in sulfur cross-link density and type. Modulus measurements are directly proportional to the number (density) of cross-links formed during the vulcanization process. High moduli indicate more efficient use of available sulfur by the curative and rubber. The type of sulfur cross-link is also important since long polysulfidic cross-links are less stable than the more desirable mono and disulfidic or carbon-carbon cross-links. The flat portions of the modulus curves (of, e.g., Li, Ba) over a 425°–550°F. curing range in FIGS. 1 and 2 reflect unusually high efficiency and stability that can only result from a high proportion of stable cross-link types.

Table V shows that the metal curatives were evaluated at 2.0 parts sulfur and the conventional thiuram accelerators at 2.5 parts sulfur. Despite this, the higher moduli and shorter rupture elongation of the barium, cerium and lithium salts indicate a tighter, denser sulfur cross-linked network has been attained than with conventional thiuram (TMTDS) cure.

Further evidence for this observation is tabulated in Table VI below, where it can be seen that the instant metal curatives offer improved efficiency and stability for high temperature vulcanization over the conventional organo-sulfur curatives.

TABLE VI

CONVERSION OF SULFUR TO CROSS-LINKS AT 500°F., EPDM

| Metal-NDC[1] | 300% Modulus | % of Max. XLD[2] | Metal-NDC[1] | 300% Modulus | % of Max. XLD[2] |
|---|---|---|---|---|---|
| Barium | 1120 | 94 | Manganese | 730 | 61 |
| Lithium | 1090 | 91 | Lead | 630 | 53 |
| Magnesium | 1060 | 89 | Copper | 520 | 43 |
| Calcium | 970 | 81 | Iron | 450 | 37 |
| Cerium | 900 | 75 | Cobalt | 380 | 32 |
| Zinc | 820 | 68 | TMTDS | 500 | 42 |
| Zirconium | 800 | 67 | Sulfur only | 900 | 75 |

[1]Neodecanoate.
[2]By setting the maximum modulus for any curative anywhere in the cure history at 100%, in this case barium, 1200 psi at 5'/430°F., a relative measure of cross-linking efficiency at 500°F. was derived by: % Eff. (500°F.) = $M_a$ (500°F.) ÷ 1200 × 100

Further, by operation in high temperature regions, quite short cure times may be effected. For example, while cure times in the prior art are often in the region of one-half hour, high temperature cures using the present metal curatives result in effective cures in from 5 to as little as 0.5 minutes.

The following additional example is meant to further illustrate, but in no way limit, the instant invention:

EXAMPLE

1:1 complexes of various metal salts of the instant invention were prepared with the materials listed in Table VII below. These complexes were then employed as primary accelerators for the sulfur vulcanization of an EPDM having 52 wt. % ethylene, 3 wt. % diene, a viscosity average molecular weight of 150,000 and a Mooney viscosity ML of 60 at 260°F. The formulation in each case was 100 parts EPDM, 5 parts zinc oxide, 1 part stearic acid, 140 parts semi-reinforcing furnace black, 60 parts naphthenic oil, 2 parts sulfur, and 2 parts accelerator. The materials were compounded in a Banbury, an internal rotor type mixer. All powdered ingredients (except sulfur and metal curative) and oil were added to the mixer with the rubber added last. The homogenized mix was dumped at 300°F. after 8 minutes. Curatives and sulfur were then added on a mill at <200°F. Strips were then cured 10 minutes at 300°–550°F. gradient temperatures. The results are shown in Table VII below.

TABLE VII

| Curvature[1] | Cure Location at 10" at °F. Initiation | Peak Physicals | Physical Levels 200% Modulus | Rupture Tensile |
|---|---|---|---|---|
| Thiuram Control | 258° | 370° | 700 | 1820 |
| PMDT ● zinc diacetate | 285° | 390° | 660 | 1620 |
| TMEDA ● zinc diacetate | 295° | 385° | 690 | 1730 |
| Anhydrous zinc diacetate | 310° | 385° | 720 | 1700 |
| EDA ● zinc diacetate | 300° | 385° | 670 | 1730 |
| PMDT ● Li Br | 290° | 385° | 550 | 1640 |
| PMDT ● Li I | 305° | 395° | 510 | 1490 |
| DiGlyme ● Li Br | 330° | 425° | 530 | 1500 |
| Sulfur only, control | 375° | 460° | 450 | 1420 |

[1]PMDT — Pentamethyl diethylene triamine.
 TMEDA — Tetramethyl ethylene diamine.
 DiGlyme — Diethylene glycol dimethyl ether.
 EDA — EThylene diamine.

From this table it can be seen that simple zinc diacetate along produces a high cure state similar to the zinc acetate complexes. This further confirms that the zinc cation is dominating cure behavior.

While the above description adequately illustrates the invention, it should be understood that the present invention in its broadest aspects is not necessarily limited to the specific materials, conditions and procedures shown therein. The present invention is limited only by the claims which follow.

What is claimed is:

1. A process for the sulfur vulcanization of a nonpolar, unsaturated hydrocarbon rubber which consists essentially of:

a. adding to 100 parts of said rubber a vulcanizable amount of sulfur and from 0.25 to 10 parts of a primary accelerator consisting essentially of a metal salt the anion of which is selected from the group consisting of acetate, chloride, nitrate, thiocyanate, octoate, naphthenate, or neodecanoate, and the metal being selected from the metals of Group I-A, Group II-A, or transition metals wherein said salt has a lattice energy of less than about 700 kcal/mole; wherein the metal salt is complexed with diethylene glycol dimethyl ether (diglyme); and b. heating the product of step (a) to a temperature in the range of about 300° to about 550°F. in order to effect cure.

* * * * *